United States Patent
Shaw

(10) Patent No.: US 10,929,025 B2
(45) Date of Patent: Feb. 23, 2021

(54) DATA STORAGE SYSTEM WITH I/O DETERMINISM LATENCY OPTIMIZATION

(71) Applicant: Seagate Technology LLC, Cupertino, CA (US)

(72) Inventor: Michael Shaw, Colorado Springs, CO (US)

(73) Assignee: Seagate Technology LLC, Fremont, CA (US)

(*) Notice: Subject to any disclaimer, the term of this patent is extended or adjusted under 35 U.S.C. 154(b) by 0 days.

(21) Appl. No.: 16/451,841

(22) Filed: Jun. 25, 2019

(65) Prior Publication Data
US 2020/0409561 A1    Dec. 31, 2020

(51) Int. Cl.
*G06F 3/06* (2006.01)

(52) U.S. Cl.
CPC .......... *G06F 3/0611* (2013.01); *G06F 3/0638* (2013.01); *G06F 3/0673* (2013.01)

(58) Field of Classification Search
CPC .................................................. G06F 3/0611
USPC ........................................................ 711/167
See application file for complete search history.

(56) References Cited

U.S. PATENT DOCUMENTS

| | | | |
|---|---|---|---|
| 8,928,677 B2 | 1/2015 | Wexler et al. | |
| 8,966,164 B1 | 2/2015 | Asnaashari et al. | |
| 9,430,412 B2 | 8/2016 | Huang | |
| 9,563,367 B2 | 2/2017 | Chu et al. | |
| 9,747,039 B1 | 8/2017 | Coleman et al. | |
| 2003/0188119 A1* | 10/2003 | Lubbers | G06F 9/50 711/170 |
| 2011/0179222 A1* | 7/2011 | Iwasaki | G06F 3/0686 711/111 |
| 2018/0067881 A1 | 3/2018 | Frandzel et al. | |
| 2018/0095675 A1 | 4/2018 | Kachare et al. | |
| 2018/0101494 A1 | 4/2018 | Davis et al. | |

* cited by examiner

*Primary Examiner* — Jae U Yu
(74) *Attorney, Agent, or Firm* — Hall Estill Attorneys at Law

(57) ABSTRACT

In a data storage system, latency optimization can be practiced by logging a plurality of data accesses to a memory in a register with each data access of the plurality of data accesses corresponding with a command generated by a host connected to the memory. The register may be analyzed with a system module to predict a command execution latency value for the plurality of data accesses that can be used to generate a deterministic data access sequence with the system module. A queue of data accesses can then be reorganized from a first sequence to the deterministic data access sequence to reduce command execution latency variability during a deterministic window selected by the host.

20 Claims, 5 Drawing Sheets

DATA STORAGE SYSTEM WITH I/O DETERMINISM LATENCY OPTIMIZATION

SUMMARY

In accordance with various embodiments, a data storage system logs a plurality of data accesses to a memory in a register over time with each data access corresponding with a command originating at a connected host. The register is analyzed by a system module to predict a command execution latency value. In response to the analysis, a plurality of accumulated pending host commands are proactively reorganized in at least one queue to reduce command execution latency variability during a deterministic window selected by the host.

Operation of a data storage system, in other embodiments, involves logging a plurality of data accesses to a memory in a register with each data access of the plurality of data accesses corresponding with a command generated by a host connected to the memory. The register is analyzed with a system module to identify an actual system operational parameter and generate a deterministic strategy in response to the identified actual system operational parameter where the deterministic strategy provides a deterministic data access sequence that is carried out via a queue reorganization to reduce command execution latency variability during a deterministic window selected by the host.

A data storage system, in some embodiments, has a system module connected to a host and a data storage device with the system module having a deterministic circuit configured to log a plurality of data accesses to the data storage device in a register with each data access of the plurality of data accesses corresponding with a command generated by a host connected to the memory. A first controller of the system module analyzes the register to identify an actual system operational parameter and generate a deterministic strategy in response to the identified actual system operational parameter with the deterministic strategy providing a deterministic data access sequence. A second controller of the system controller is configured to reorganize a queue of data accesses from a first sequence to the deterministic data access sequence to reduce command execution latency variability during a deterministic window selected by the host.

DETAILED DESCRIPTION

Figure 1:
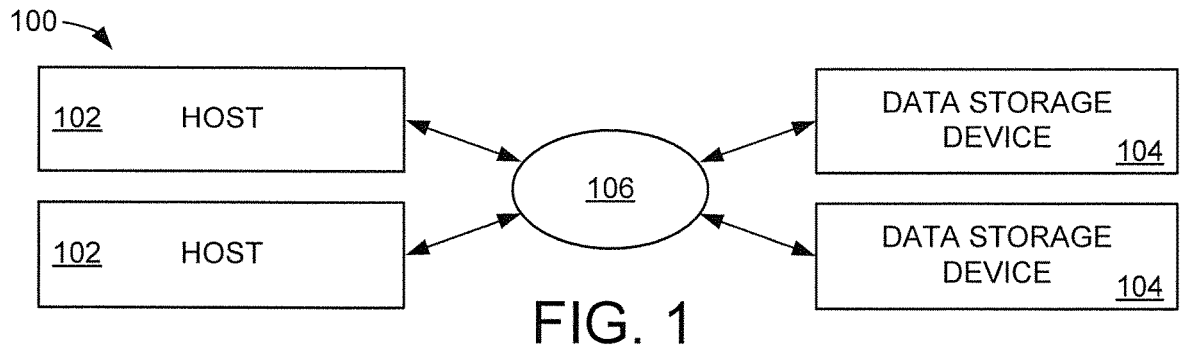
FIG. 1 provides a block representation of a data storage system in which various embodiments can be practiced.

The various embodiments of a data storage system generally relate to structure and methods of proactively optimizing data storage performance, particularly in deterministic data access periods.

As data storage systems become more capable, sophisticated data storage protocol can be employed, such as input/output determinism (IOD). A goal of IOD is to minimize the impact of operations between data sets of memory, particularly data sets with a Non-Volatile Memory Express (NVMe) standard. Although IOD can provide control over the physical separation of storage media to avoid interactions, there are other shared, or otherwise common, controller resources that can also be optimized to provide additional isolation of command execution between data sets. However, the utilization of controller resources does not necessarily optimize data access consistency and can favor peak data access performance and low latency at the expense of queued data access request execution consistency.

With such IOD issues in mind, a data storage system can be configured to monitor data storage operations in a manner that allows predictive analysis of IOD performance to indicate proactive actions that can increase the consistency of command execution latency during a deterministic window. The ability to take proactive actions that are intelligently selected to cure predicted IOD latency inconsistencies allows for heightened IOD consistency due to lower latency variability.

In general, solid state drives (SSDs) are data storage devices that store user data in non-volatile memory (NVM) made up of an array of solid-state semiconductor memory cells. SSDs usually have an NVM module and a controller. The controller controls the transfer of data between the NVM and a host device. The NVM will usually be NAND flash memory, but other forms of solid-state memory can be used.

A flash memory module may be arranged as a series of dies. A die represents a separate, physical block of semiconductor memory cells. The controller communicates with the dies using a number of channels, or lanes, with each channel connected to a different subset of the dies. Any respective numbers of channels and dies can be used. Groups of dies may be arranged into die sets, which may correspond with the NVMe standard. This standard enables multiple owners (users) to access and control separate portions of a given SSD (or other memory device).

The NVMe specification provides that a storage device should have the ability to provide guaranteed levels of deterministic performance for specified periods of time (deterministic windows, or DWs). To the extent that a garbage collection operation is scheduled during a DW, it is desirable to ensure that the actual time that the garbage collection operation would require to complete is an accurate estimate in order for the system to decide whether and when to carry out the GC operation.

SSDs have a top-level controller circuit and a flash (or other semiconductor) memory module. A number of channels, or lanes, are provided to enable communications between the controller and dies within the flash memory. One example is an 8 lane/128 die configuration, with each lane connected to 16 dies. The dies are further subdivided into planes, GCUs, erasure blocks, pages, etc. Groups of dies may be arranged into separate NVMe sets, or namespaces. This allows the various NVMe sets to be concurrently serviced for different owners (users).

SSDs have a limited number of hold up energy after power loss that is tied to the number of capacitors. More capacitors are needed in order to keep a drive alive longer after power loss, minimizing the number of capacitors can increase system performance. On the other hand, limiting the amount of host and metadata that can be written after power loss can restrict the drive performance, since work will need to denied until previously open work has completed. In contrast, the more metadata you can write on power loss improves the time to ready when the drive comes back up again, and less work needs to be done in order to fully reload the drive context.

These and other features may be practiced in a variety of differently configured data storage systems, but various embodiments conduct data access queue arbitration optimization in the example data storage system 100 shown as a simplified block representation in FIG. 1. The system 100 has a plurality of different hosts 102 connected to a plurality of different data storage devices 104 via a network 106. The assorted hosts 102 can be any remote computing device, such as a computer, server, circuit, node, or processor, capable of generating or transferring data to be stored in one or more data storage devices 104.

The respective data storage devices 104 may have similar, or dissimilar, configurations, and physical locations, that provide a non-volatile data storage capacity to the respective hosts 102 connected to the network 106. The network 106 can be any wired and/or wireless connection between hosts 102 and storage destinations. In some embodiments, the network 106 comprises circuitry allowing for the intelligent organization and distribution of data from one or more hosts 102 to one or more destination data storage devices 104.

Figure 2:
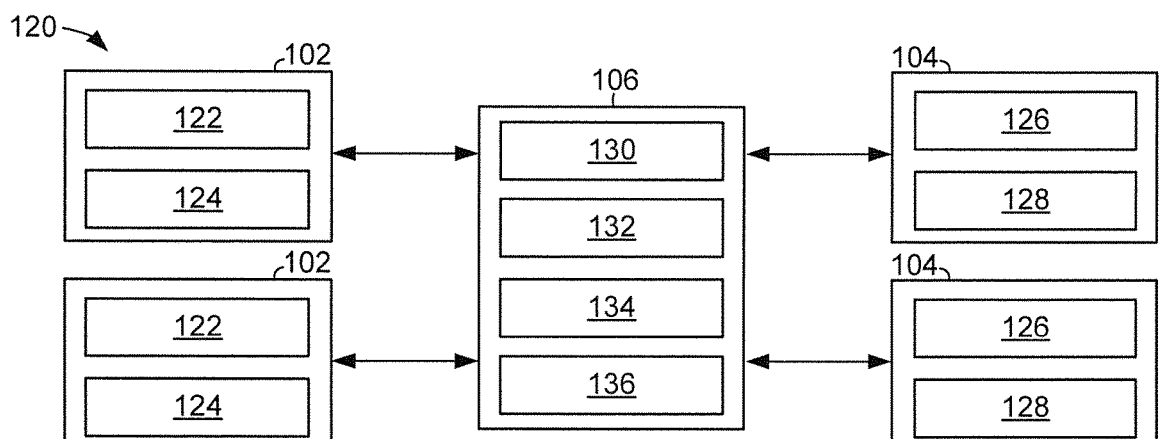
FIG. 2 displays portions of an example data storage system arranged in accordance with some embodiments.

FIG. 2 illustrates a block representation of an example data storage system 120 where the respective hosts 102 each have a local controller 122 and memory 124 that enables data to be transferred to the network 106. It is contemplated that the hosts 102 designate a data storage destination, such as a logical and/or physical address in the local memory 126 of one or more data storage devices 104, but such address assignment is not required. It is also contemplated that a local device controller 128 can participate in organizing and storing data in memory 126 that originated in a host 102.

While the network 106 may simply transfer data, and other data information, between a host 102 and at least one data storage device 104, various embodiments configure the network 106 with at least one network controller 130 that can utilize one or more network buffers 132 to temporarily, or permanently, store data. The network controller 130 may also utilize network arbitration circuitry 134 to organize and/or deploy data requests, and associated data, to/from the various data storage devices 104. A prediction circuit 136 may be selectively utilized by the network controller 130 to analyze data requests allocation, data request execution, data queue performance, data storage device performance, and other data storage system operational parameters to compute future data access request, and data access execution, metrics that can aid in the organization and deployment to provide heightened I/O determinism data access consistency to one or more hosts 102.

Figure 3:
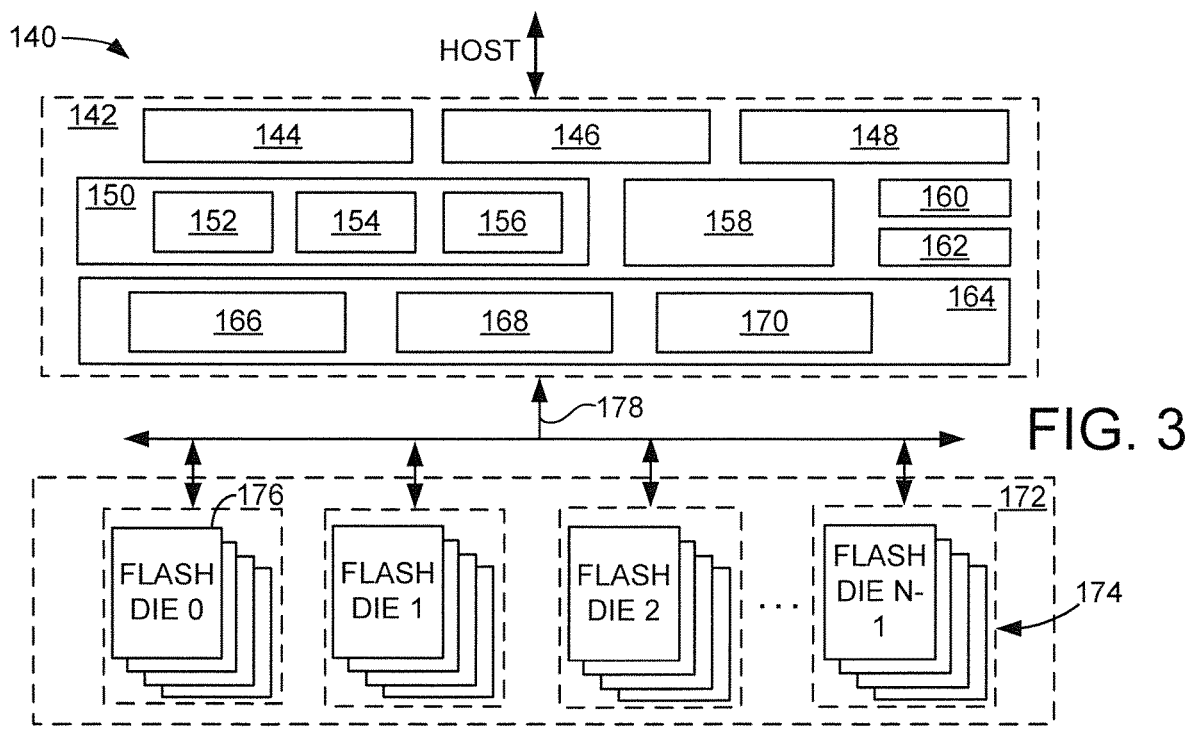
FIG. 3 shows aspects of an example data storage system configured in accordance with assorted embodiments.

FIG. 3 displays an example data storage device 140 generally corresponding to the device 104 in FIGS. 1 & 2. The device 140 is configured as a solid state drive (SSD) that communicates with one or more host devices via one or more Peripheral Component Interface Express (PCIe) ports, although other configurations can be used. The NVM is contemplated as comprising NAND flash memory, although other forms of solid state non-volatile memory can be used.

In at least some embodiments, the SSD operates in accordance with the NVMe standard, which enables different users to allocate die sets for use in the storage of data. Each die set may form a portion of a Namespace that may span multiple SSDs or be contained within a single SSD. The SSD 140 can comprise a controller circuit 142 with a front-end controller 144, a core controller 146 and a back-end controller 148. The front-end controller 144 performs host I/F functions, the back-end controller 148 directs data transfers with the memory module 144 and the core controller 146 provides top level control for the device.

Each controller 144, 146 and 148 has a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 150 represents various forms of volatile and/or non-volatile memory (e.g., SRAM, DDR DRAM, flash, etc.) utilized as local memory by the controller 142. Various data structures and data sets may be stored by the memory including one or more map structures 152, one or more caches 154 for map data and other control information, and one or more data buffers 156 for the temporary storage of host (user) data during data transfers.

A non-processor based hardware assist circuit 158 may enable the offloading of certain memory management tasks by one or more of the controllers as required. The hardware circuit 158 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in hardware and/or firmware in the controller 142, such as a data compression block 160 and an encryption block 162. The data compression block 160 applies lossless data compression to input data sets during write operations, and subsequently provides data de-compression during read operations. The encryption block 162 provides any number of cryptographic functions to input data including encryption, hashes, decompression, etc.

A device management module (DMM) 164 supports back end processing operations and may include an outer code engine circuit 166 to generate outer code, a device I/F logic circuit 168 and a low density parity check (LDPC) circuit 170 configured to generate LDPC codes as part of the error detection and correction strategy used to protect the data stored by the by the SSD 140.

A memory module 172 corresponds to the memory 126 in FIG. 2 and includes a non-volatile memory (NVM) in the form of a flash memory 174 distributed across a plural number N of flash memory dies 176. Rudimentary flash memory control electronics may be provisioned on each die 176 to facilitate parallel data transfer operations via one or more channels (lanes) 178.

Figure 4:
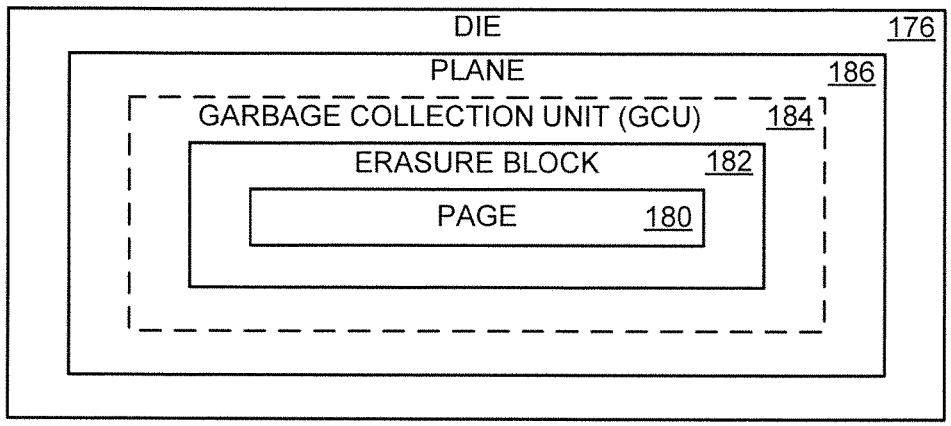
FIG. 4 is a block representation of an example memory capable of being used in the data storage system of FIGS. 1-3.

FIG. 4 shows an arrangement of a flash memory die 176 that can be used in the flash memory 174 of FIG. 3 in some embodiments. Other configurations can be used. The smallest unit of memory that can be accessed at a time is referred to as a page 180. A page may be formed using a number of flash memory cells that share a common word line. The storage size of a page can vary; current generation flash memory pages can store, in some cases, 16 KB (16,384 bytes) of user data.

The memory cells associated with a number of pages are integrated into an erasure block 182, which represents the smallest grouping of memory cells that can be concurrently erased in a NAND flash memory. A number of erasure blocks 182 are turn incorporated into a garbage collection unit (GCU) 184, which are logical structures that utilize erasure blocks that are selected from different dies. GCUs are allocated and erased as a unit. In some embodiments, a GCU may be formed by selecting one or more erasure blocks from each of a population of dies so that the GCU spans the population of dies.

Each die 176 may include a plurality of planes 186. Examples include two planes per die, four planes per die, etc. although other arrangements can be used. Generally, a plane is a subdivision of the die 176 arranged with separate read/write/erase circuitry such that a given type of access operation (such as a write operation, etc.) can be carried out simultaneously by each of the planes to a common page address within the respective planes.

Figure 5:
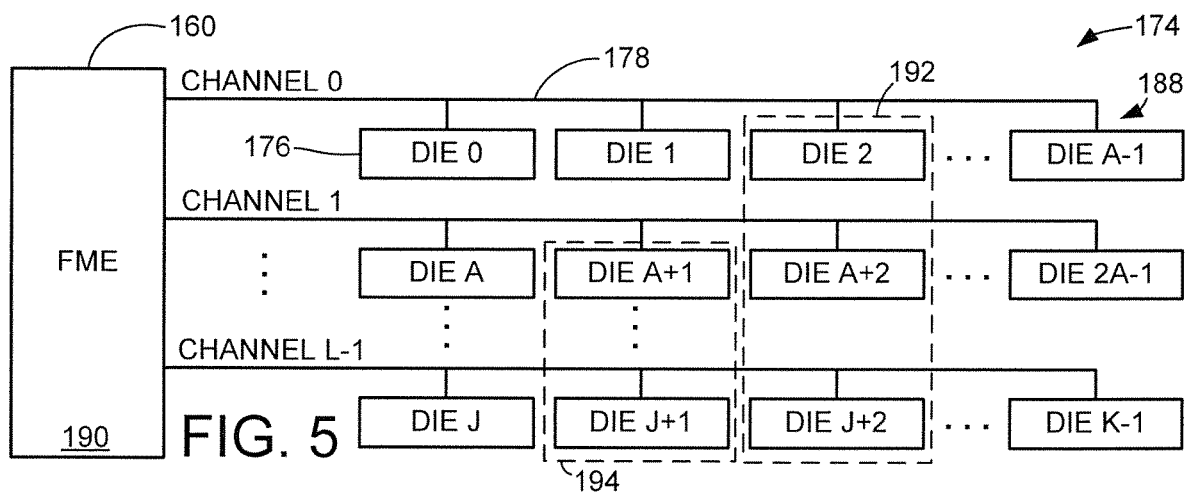
FIG. 5 illustrates portions of an example data storage system that can be utilized in the data storage system of FIGS. 1-3 in accordance with various embodiments.

FIG. 5 shows further aspects of the flash memory 174 in some embodiments. A total number K dies 176 are provided and arranged into physical die groups 188. Each die group 188 is connected to a separate channel 178 using a total number of L channels. In one example, K is set to 128 dies, L is set to 8 channels, and each physical die group has 16 dies. As noted above, a single die within each physical die group can be accessed at a time using the associated channel. A flash memory electronics (FME) circuit 190 of the flash memory module 174 controls each of the channels 168 to transfer data to and from the dies 176.

In some embodiments, the various dies are arranged into one or more die sets. A die set represents a portion of the storage capacity of the SSD that is allocated for use by a particular host (user/owner). Die sets are usually established with a granularity at the die level, so that some percentage of the total available dies 176 will be allocated for incorporation into a given die set.

A first example die set is denoted at 192 in FIG. 5. This first set 192 uses a single die 176 from each of the different channels 178. This arrangement provides fast performance during the servicing of data transfer commands for the set since all eight channels 178 are used to transfer the associated data. A limitation with this approach is that if the set 192 is being serviced, no other die sets can be serviced during that time interval. While the set 192 only uses a single die from each channel, the set could also be configured to use multiple dies from each channel, such as 16 dies/channel, 32 dies/channel, etc.

A second example die set is denoted at 194 in FIG. 5. This set uses dies 176 from less than all of the available channels 178. This arrangement provides relatively slower overall performance during data transfers as compared to the set 192, since for a given size of data transfer, the data will be transferred using fewer channels. However, this arrangement advantageously allows the SSD to service multiple die sets at the same time, provided the sets do not share the same (e.g., an overlapping) channel 178.

It is noted that data may be stored to the flash memory module 174 as map units (MUs) that represent fixed sized blocks of data that are made up of one or more user logical block address units (LBAs) supplied by a host. Without limitation, LBAs may have a first nominal size, such as 512 bytes (B), 1024B (1 KB), etc., and the MUs may have a second nominal size, such as 4096 B (4 KB), etc. The application of data compression may cause each MU to have a smaller size in terms of actual bits written to the flash memory 174.

MUs can be arranged into the aforementioned pages 180, as shown in FIG. 4, which are written to the memory 174. In the present example, using an MU size of 4 KB, then nominally four (4) MUs may be written to each page. Other configurations can be used. To enhance data density, multiple pages worth of data may be written to the same flash memory cells connected to a common control line (e.g., word line) using multi-bit writing techniques; MLCs (multi-level cells) write two bits per cell, TLCs (three-level cells) write three bits per cell; XLCs (four level cells) write four bits per cell, etc.

Data stored by an SSD are often managed using metadata. The metadata provide map structures to track the locations of various data blocks to enable the SSD 140 to locate the physical location of existing data. For example, during the servicing of a read command it is generally necessary to locate the physical address within the flash memory 176 at which the most current version of a requested block (e.g., LBA) is stored, so that the controller can schedule and execute a read operation to return the requested data to the host. During the servicing of a write command, new data are written to a new location, but it is still necessary to locate the previous data blocks sharing the same logical address as the newly written block so that the metadata can be updated to mark the previous version of the block as stale and to provide a forward pointer or other information to indicate the new location for the most current version of the data block.

Figure 6:
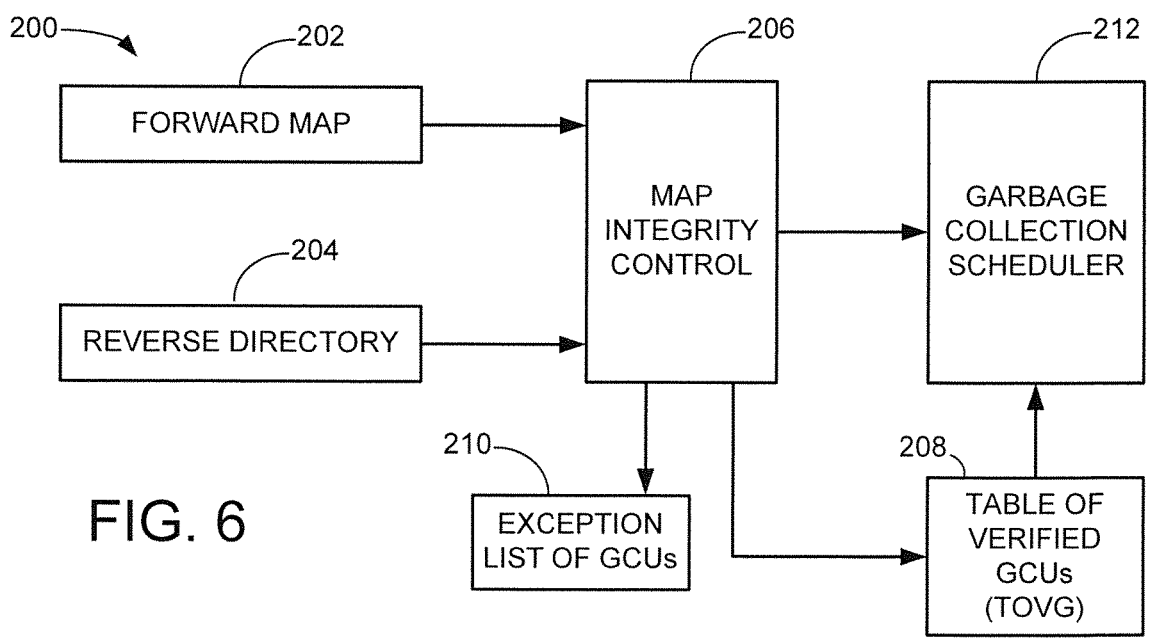
FIG. 6 depicts a functional block diagram for a data storage system operated in accordance with some embodiments.

FIG. 6 shows a functional block diagram for a data storage device management circuit 200 that can be utilized in accordance with some embodiments. The circuit 200 may form a portion of the controller 142 and may be realized using hardware circuitry and/or one or more programmable processor circuits with associated firmware in memory. The circuit 200 includes the use of a forward map 202 and a reverse directory 204. As noted above, the forward map and reverse directory are metadata data structures that describe the locations of the data blocks in the flash memory 172. During the servicing of host data transfer operations, as well as other operations, the respective portions of these data structures are located in the flash memory or other non-volatile memory location and copied to local memory 126 (see e.g., FIG. 2).

The forward map 202 provides a flash transition layer (FTL) to generally provide a correlation between the logical addresses of various blocks and the physical addresses at which the various blocks are stored (e.g., die set, die, plane, GCU, EB, page, bit offset, etc.). The contents of the forward map 202 may be stored in specially configured and designated GCUs in each die set.

The reverse directory 204 provides a physical address to logical address correlation. The reverse directory contents may be written as part of the data writing process to each GCU, such as in the form of a header or footer along with the data being written. Generally, the reverse directory provides an updated indication of how many of the data blocks (e.g., MUAs) are valid (e.g., represent the most current version of the associated data).

The circuit 200 further includes a map integrity control circuit 206. That generally operates at selected times to recall and compare, for a given GCU, the forward map data and the reverse directory data. This evaluation step includes processing to determine if both metadata structures indicate the same number and identify of the valid data blocks in the GCU. If the respective forward map and reverse directory match, the GCU is added to a list of verified GCUs in a data structure referred to as a table of verified GCUs, or TOVG 208. The table can take any suitable form and can include a number of entries, with one entry for each GCU. Each entry can list the GCU as well as other suitable and useful information, such as but not limited to a time stamp at which the evaluation took place, the total number of valid data blocks that were determined to be present at the time of validation, a listing of the actual valid blocks, etc.

Should the control circuit 206 find a mismatch between the forward map 202 and the reverse directory 204 for a given GCU, the control circuit 206 can further operate to perform a detailed evaluation to correct the mismatch. This may include replaying other journals or other data structures to trace the history of those data blocks found to be mismatched. The level of evaluation required will depend on the extent of the mismatch between the respective metadata structures.

For example, if the forward map 202 indicates that there should be some number X valid blocks in the selected GCU, such as 12 valid blocks, but the reverse directory 204 indicates that there are only Y valid blocks, such as 11 valid blocks, and the 11 valid blocks indicated by the reverse directory 204 are indicated as valid by the forward map, then the focus can be upon the remaining one block that is valid according to the forward map but invalid according to the reverse directory. Other mismatch scenarios are envisioned.

The mismatches can arise due to a variety of factors such as incomplete writes, unexpected power surges or disruptions that prevent a full writing of the state of the system, etc. Regardless, the control circuit can expend the resources as available to proactively update the metadata. In some embodiments, an exception list 210 may be formed as a data structure in memory of GCUs that have been found to require further evaluation. In this way, the GCUs can be evaluated later at an appropriate time for resolution, after which the corrected GCUs can be placed on the verified list in the TOVG 208.

It will be noted that the foregoing operation of the control circuit 206 in evaluating GCUs does not take place once a garbage collection operation has been scheduled; instead, this is a proactive operation that is carried out prior to the scheduling of a garbage collection operation. In some cases, GCUs that are approaching the time at which a garbage collection operation may be suitable, such as after the GCU has been filled with data and/or has reached a certain aging limit, etc., may be selected for evaluation on the basis that it can be expected that a garbage collection operation may be necessary in the relatively near future.

FIG. 6 further shows the management circuit 200 having a garbage collection scheduler circuit 212. This circuit 212 generally operates once it is appropriate to consider performing a garbage collection operation, at which point the circuit 212 selects from among the available verified GCUs from the table 208. In some cases, the circuit 212 may generate a time of completion estimate to complete the garbage collection operation based on the size of the GCU, the amount of data to be relocated, etc.

As will be appreciated, a garbage collection operation can include accessing the forward map and/or reverse directory 202, 204 to identify the still valid data blocks, the reading out and temporary storage of such blocks in a local buffer memory, the writing of the blocks to a new location such as in a different GCU, the application of an erasure operation to erase each of the erasure blocks in the GCU, the updating of program/erase count metadata to indicate the most recent erasure cycle, and the placement of the reset GCU into an allocation pool awaiting subsequent allocation and use for the storage of new data sets.

Figure 7:
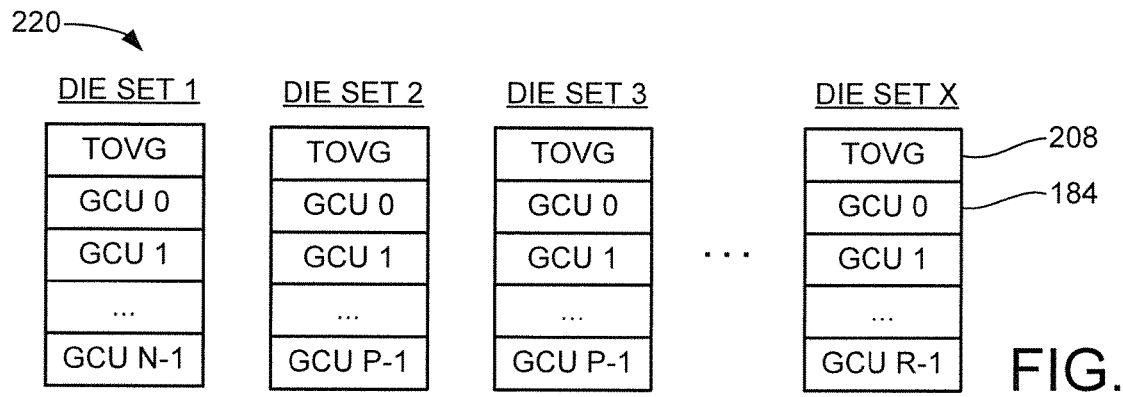
FIG. 7 conveys portions of an example data storage system arranged in accordance with assorted embodiments.

FIG. 7 shows a number of die sets 220 that may be arranged across the SSD 140 in some embodiments. Each set 220 may have the same nominal data storage capacity (e.g., the same number of allocated dies, etc.), or each may have a different storage capacity. The storage capacity of each die set 220 is arranged into a number of GCUs 184 as shown. In addition, a separate TOVG (table of verified GCUs) 208 may be maintained by and in each die set 200 to show the status of the respective GCUs. From this, each time that it becomes desirable to schedule a garbage collection operation, such as to free up new available memory for a given set, the table 208 can be consulted to select a GCU that, with a high degree of probability, can be subjected to an efficient garbage collection operation without any unexpected delays due to mismatches in the metadata (forward map and reverse directory).

Figure 8:
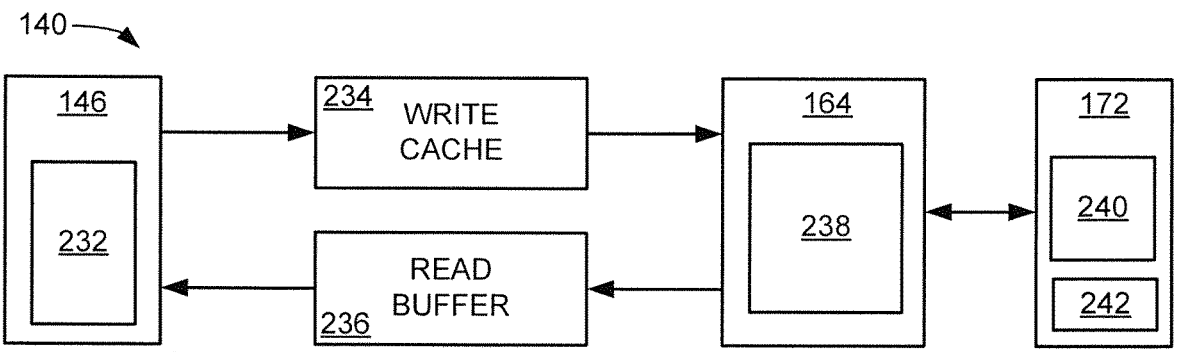
FIG. 8 illustrates portions of an example data storage system that may be employed in accordance with various embodiments.

FIG. 8 shows a functional block representation of additional aspects of the SSD 140. The core CPU 146 from FIG. 3 is shown in conjunction with a code management engine (CME) 232 that can be used to manage the generation of the respective code words and outer code parity values for both standard and non-standard parity data sets. During write operations, input write data from the associated host are received and processed to form MUs which are placed into a non-volatile write cache 234 which may be flash memory or other form(s) of non-volatile memory. The MUs are transferred to the DMM circuit 164 for writing to the flash memory 152 in the form of code words. During read operations, one or more pages of data are retrieved to a volatile read buffer 236 for processing prior to transfer to the host.

The CME 232 determines the appropriate inner and outer code rates for the data generated and stored to memory. In some embodiments, the DMM circuit 164 may generate both the inner and outer codes. In other embodiments, the DMM circuit 164 generates the inner codes (see e.g., LDPC circuit 170 in FIG. 3) and the core CPU 146 generates the outer code words. In still other embodiments, the same processor/controller circuit generates both forms of code words. Other arrangements can be used as well. The CME 232 establishes appropriate code rates for both types of code words.

During generation of the outer codes, a parity buffer 238 may be used to successively XOR each payload being written during each pass through the dies. Both payload data 240 and map data 242 will be stored to flash 172. The execution of data access requests to store data to, or read data from, one or more flash memories 172 of one or more data storage devices 104 can be facilitated with multiple queues arranged in accordance with the NVMe standard.

Figure 9:
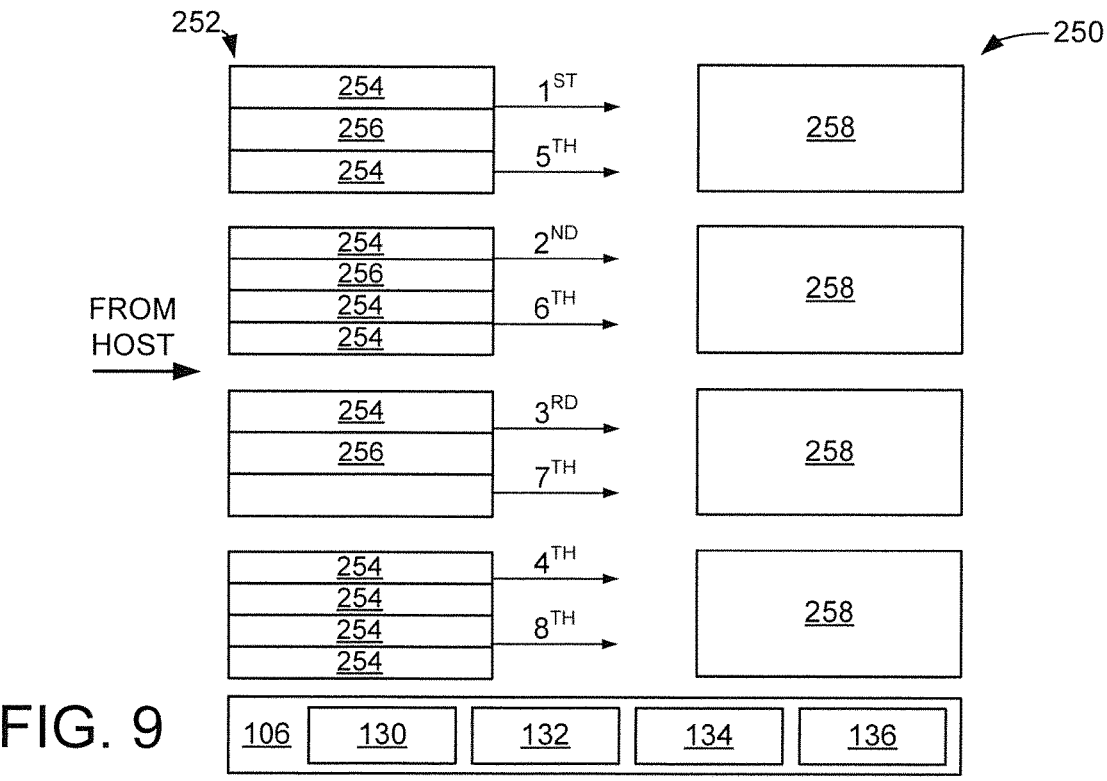
FIG. 9 is a block representation of portions of an example data storage system in which various embodiments may be practiced.

FIG. 9 conveys a block representation of portions of an example data storage system 250 in which data request queues 252 are employed in accordance with various embodiments. It is initially noted that the various data request queues 252 can store a request 254, and data block 256 associated with the stored requests 254, can be located in a data storage device 104 and/or a network device, such as device 106 that has a network controller 130 and memory 132. The ability to create and utilize data request queues 252 at the network 106 and/or local data storage device 104 level allows for a diverse range of request 254, and request data 256, queuing capabilities and configurations that can be catered to the data storage arrangement and data request history to optimize operations to achieve desired data access performance.

One such data storage queuing arrangement has the respective data requests 254, and/or data 256, assigned a destination address in at least one data set 258 of a non-volatile memory 126 while being temporarily stored in the queues 252 of one or more network buffers 132. The network buffer(s) 132 can be connected to a network controller 130 that can selectively employ arbitration 134 and/or prediction 136 circuitry for any stored request 254 and/or request data 256.

The network controller 130 alone, or in cooperation with one or more local memory controllers 128, can select an order of data request 254 execution with the arbitration circuitry 134 that corresponds with a round robin sequence. As shown by numbered arrows from the respective queues 252, the arbitration circuitry 134 can consecutively, and cyclically, execute a data request 254 stored in a different queue 252. Accordingly, each queue 252 has a pending request 254 executed to store data to, or retrieve data from, a selected data set 258 prior to repeating the execution of a request 252 from a single queue 252. Through the round robin arbitration of pending data requests 254, the size of data 256 being transferred and the time involved with execution of the requests 254 can vary to a relatively high degree, which results in inconsistent system 250 resource utilization and data request execution.

Figure 10:
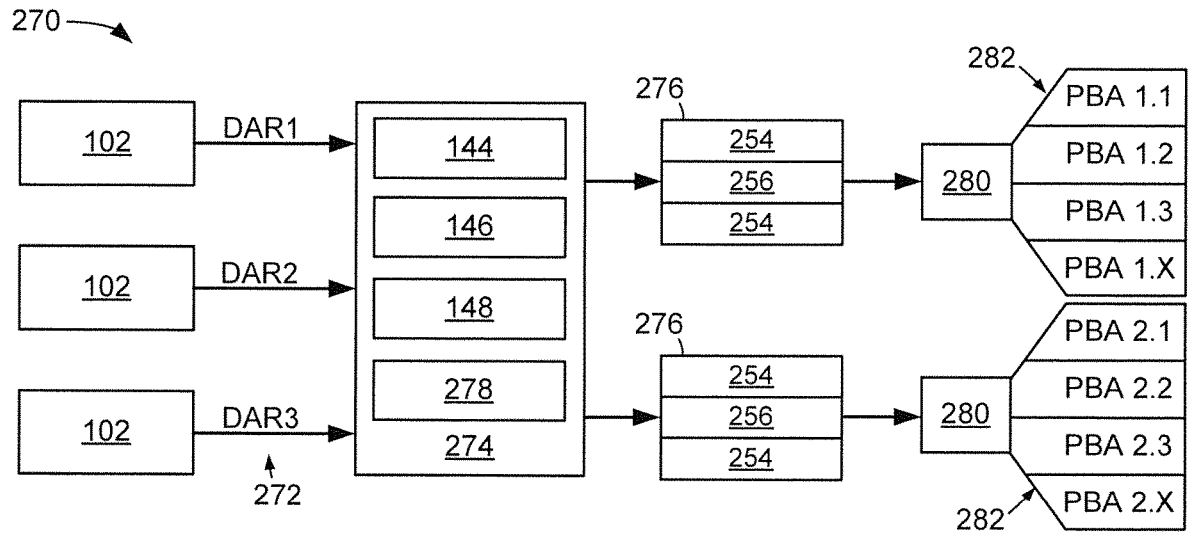
FIG. 10 represents portions of an example data storage system configured in accordance with various embodiments.

FIG. 10 depicts portions of an example data storage system 270 arranged to provide optimal IOD latency performance in a data storage system in accordance with various embodiments. The data storage system 270 can receive one or more data access requests/commands (DAR) 272 from one or more remote hosts 102 that are funneled to a system module 274 for organization and execution. It is noted that a DAR can be any command or request to a memory, such as data write, data read, metadata update, or data map refresh.

The system module 274 can employ any number of intelligent controllers, such as the multiple controllers 144/146/148 shown in FIG. 10, to organize the DAR into logical queues 276 that correspond with different portions of one or more downstream data storage devices 104. While not required or limiting, at least one queue 276 can be resident in a volatile, or non-volatile, cache 278 of the system module 274 where the request/command as well as any data corresponding to the DAR are physically located. While being stored in cache 278, the various DARs are organized into logical sequences intended to be executed in an order to the associated namespace 280 and constituent physical block addresses 282. That is, the system module 274 can organize pending DARs 272 from various hosts 102 into queues 276 that are sequentially executed to one or more namespaces 280 of the connected devices 104.

Although the organization of DARs 272 into different queues 276 and executable sequences can provide efficient data storage system 270 operation, such organization is reactive in nature, which fails to mitigate future data access latency inconsistencies. In other words, DAR 272 execution consistency can be increased by utilizing the system module 274 to log and analyze system 270 operation to predict future operational latencies that can jeopardize the effectiveness of an IOD deterministic time window. By having a reliable future latency estimate from the system module 274, queued DARs 272 can be reorganized to increase execution latency consistency, even if that increased consistency comes at the expense of overall queue execution speed.

Figure 11:
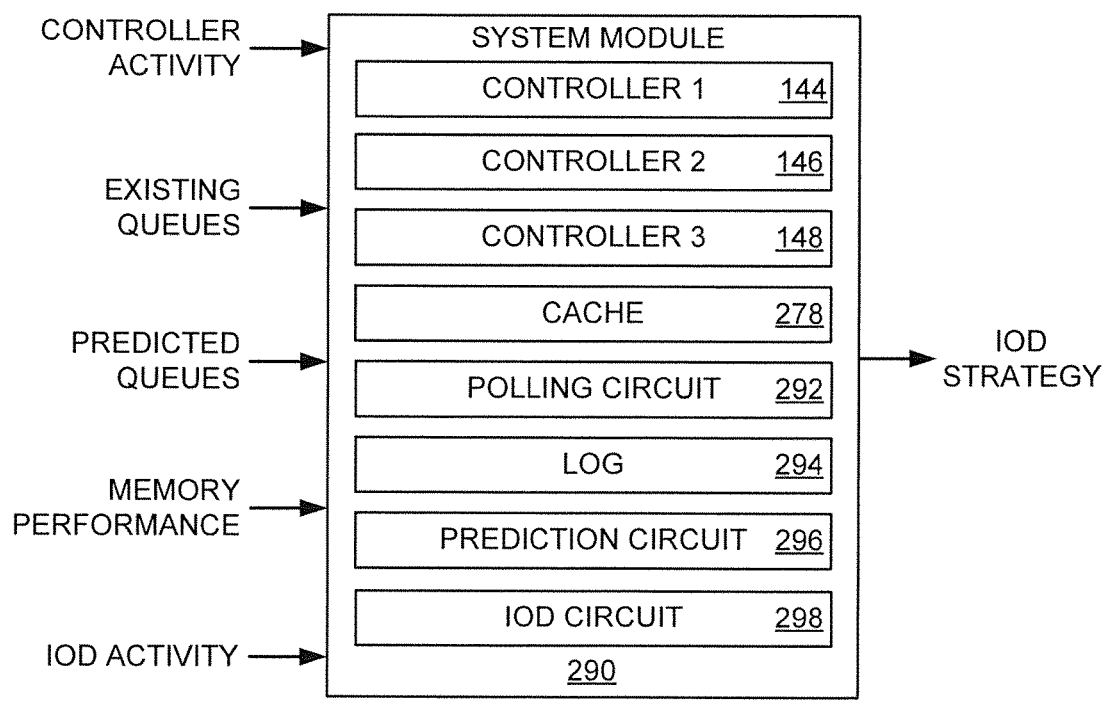
FIG. 11 displays a block representation of an example system module that can be utilized by assorted embodiments of a data storage system.

FIG. 11 depicts a block representation of an example system module 290 that can be utilized in a data storage system to provide predictive IOD execution consistency. A system module 290 can employ at least one controller 144/146/148 that directs operations of incoming DARs 272, and outgoing data, which may involve temporary storage in an on-chip volatile cache 278. The controllers 144/146/148 can engage a polling circuit 292 to identify various operational characteristics of a data storage system that are used to populate a log 294. Such polling circuit 292 can simply monitor data access operations over time, such as error rate, namespace capacity, pending DAR volume, actual data access latency, and average latency. The polling circuit 292 can also be tasked with computing operational characteristics of a data storage device and/or system, such as different queue sizes, namespace designations, arbitration mechanisms, and deterministic window latency values.

It is contemplated that the polling circuit 292 monitors at least system controller activity, existing queue activity, and data storage performance. Such activity can be complemented by a prediction circuit 296 that takes the logged results of the polling circuit 292, along with any queue activity predicted by simple modelling and/or pattern recognition, to forecast at least a DAR execution latency value for a pending DAR located in at least one queue. That is, the prediction circuit 296 can intake a variety of parameters to accurately predict DAR execution latency for a single DAR as well as for a queued sequence of DARs.

The prediction of DAR execution latency allows the IOD circuit 298 of the system module 290 to evaluate one or more hypothetical queue configuration. For instance, the IOD circuit 298 can evaluate one or more reorganizations of DARs within a single queue, reorganizations of DARs in multiple queues, and reorganizations of queues themselves to determine the optimal configuration of DARs and queues to provide deterministic window performance to one or more hosts. Thus, the IOD circuit 298 can develop an IOD strategy from the results of the polling 292 and prediction 296 circuits that generates one or more proactive queue actions to increase the availability and accuracy of DAR execution latency during a deterministic window.

Figure 12:
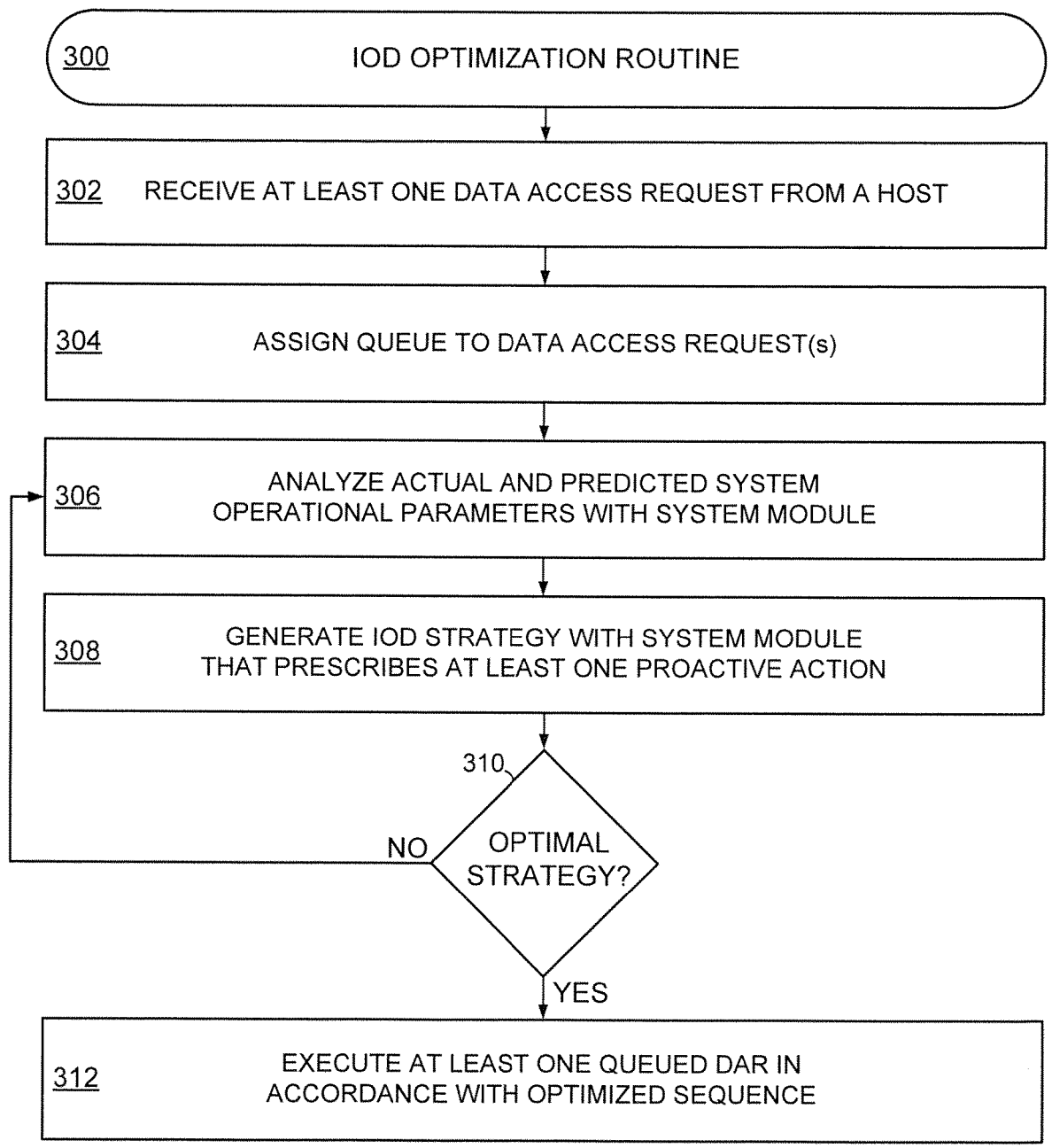
FIG. 12 is an example IOD optimization routine that can be executed by the respective embodiments of FIGS. 1-11.

FIG. 12 conveys a flowchart of an example IOD optimization routine 300 that can be carried out with the assorted embodiments of FIGS. 1-11. Initially, step 302 receives at least one data access request from a host. Such a request can be any serviceable action to one or more data storage devices, such as a data write, data read, metadata update, map refresh, or other command. The received DAR is then assigned a particular queue in step 304 by a system module in response to an initial assignment protocol. It is contemplated that an assignment protocol can consist of various namespace, physical address, and queue arbitration techniques, such as FIFO, random, or least populated first.

As a result of the initial assignment protocol, DARs accumulate in one or more queues and are pending to be executed in a predetermine sequence, such as FIFO, smallest first, largest first, slowest first, fastest first, or reverse chronological order. The population of one or more queues allows the system module to analyze actual and predicted system operational parameters in step 306 and subsequently generate an IOD strategy in step 308 that prescribes at least one proactive action to a queue and/or pending DAR to increase DAR execution latency consistency.

As a non-limiting example, the sequence of a queue can be proactively altered in accordance with an IOD strategy to reorganize the order in which pending DARs are to be executed. Another example of IOD strategy proactive actions involves moving pending DARs between different queues, which may result in the assignment of different namespace and/or physical addresses for the DAR. While numerous different proactive actions may be conducted over time, as prescribed by the system module, some embodiments verify the effectiveness of proactive action in view of any newly received DARs or other system performance characteristics. Decision 310 evaluates the result of one or more proactive actions by testing the current pending sequence of at least one queue for DAR execution latency consistency.

Although the hypothetical testing of a queue sequence may not be precisely accurate, the time and computing power employed to conduct the testing can provide verification of the IOD strategy or alert the system module that further revisions are necessary to optimize DAR execution latency consistency. In the case of the latter, routine 300 returns to step 306 for another evaluation of the data storage system and implementation of an IOD strategy. In the case of the former, routine 300 proceeds to step 312 where the DARs of at least one queue are executed in accordance with an optimized sequence prescribed by the IOD strategy.

It is noted that the optimized queue sequence from the IOD strategy may physically move a DAR, and/or the data associated with the DAR, or may maintain the physical address of the DAR while altering the logical execution order. Regardless, the pending sequence of multiple DARs can be changed in accordance with the IOD strategy.

In an operational example of routine 300, step 312 occurs while a host enters a deterministic window for at least one queue, namespace, or data storage device that is enabled by the proactive DAR sequence alteration of the IOD strategy. That is, a queue that otherwise would not be eligible for a deterministic window due to inconsistent DAR execution latency can enter a deterministic window as a result of the IOD strategy prescribed proactive action(s).

What is claimed is:

1. A method comprising:
   logging a plurality of data accesses to a memory in a register, each data access of the plurality of data accesses corresponding with a command generated by a host connected to the memory;
   analyzing the register with a system module to identify an actual system operational parameter;
   generating a deterministic strategy with the system module in response to the identified actual system operational parameter, the deterministic strategy providing a deterministic data access sequence; and
   reorganizing a queue of data accesses from a first sequence to the deterministic data access sequence while at least one of the plurality of data accesses are executed to the data storage device connected to the system module, the deterministic data access sequence configured to reduce command execution latency variability during a deterministic window selected by the host.

2. The method of claim 1, wherein the first sequence and the deterministic data access sequence are different.

3. The method of claim 1, wherein the reorganization of the queue is conducted proactively prior to execution of any of the plurality of data accesses stored in the queue.

4. The method of claim 1, wherein the reorganization of the queue is conducted while each of the plurality of data accesses are executed to a data storage device connected to the system module.

5. The method of claim 1, wherein the actual operational parameter is data read latency in a namespace connected to the system module where each of the plurality of data access requests are assigned.

6. The method of claim 1, wherein the actual operational parameter is error rate in a namespace connected to the system module where each of the plurality of data access requests are assigned.

7. The method of claim 1, wherein the deterministic window maintains a predetermined read latency between the host and a data storage device for a period of time determined by the system module.

8. The method of claim 1, wherein a first controller of the system module reorganizes the queue while a second controller of the system module services data access requests in the deterministic window.

9. The method of claim 1, wherein a first controller of the system module and a second controller of the system module concurrently reorganize the queue and service a plurality of data access requests of the deterministic window.

10. A method comprising:
    logging a plurality of data accesses to a memory in a register, each data access of the plurality of data accesses corresponding with a command generated by a host connected to the memory;
    analyzing the register with a system module to predict a command execution latency value for the plurality of data accesses;
    generating a first deterministic data access sequence with the system module in response to the predicted command execution latency value; and
    reorganizing a queue of data accesses from a first sequence to the first deterministic data access sequence to reduce command execution latency variability during a deterministic window selected by the host, the system module prescribing at least one proactive action to increase the availability and accuracy of data access request execution consistency during the deterministic window.

11. The method of claim 10, wherein the command execution latency value is an average of an execution of the plurality of data accesses queued in the queue.

12. The method of claim 10, wherein the system module evaluates one or more hypothetical sequences in response to the analysis of at least one operational parameter and the predicted future operational parameter of a data storage device connected to the system module.

13. The method of claim 10, wherein the at least one proactive action is part of a deterministic strategy generated by the system module.

14. The method of claim 10, wherein the deterministic window concurrently services more than one host connected to the system module.

15. The method of claim 10, wherein the deterministic window concurrently services more than one namespace.

16. The method of claim 10, wherein the system module proactively moves a pending data access request from the first cache to a second cache to reorganize the queue.

17. The method of claim 10, wherein the system module generates a second deterministic data access sequence in response to a determination that the first deterministic data access sequence is not optimized to at least one detected operational parameter of a data storage device connected to the system module.

18. An apparatus comprising a system module connected to a host and a data storage device, the system module comprising a deterministic circuit configured to log a plurality of data accesses to the data storage device in a register with each data access of the plurality of data accesses corresponding with a command generated by a host connected to the memory, a first controller of the system module analyzes the register to identify an actual system operational parameter and generate a deterministic strategy in response to the identified actual system operational parameter, the actual operational parameter is error rate in a namespace connected to the system module where each of the plurality of data access requests are assigned, the deterministic strategy providing a deterministic data access sequence, a second controller of the system controller configured to reorganize a queue of data accesses from a first sequence to the deterministic data access sequence to reduce command execution latency variability during a deterministic window selected by the host.

19. The apparatus of claim 18, wherein the system module comprises a polling circuit configured to monitor data access operations over time to identify multiple different operational characteristics of the data storage device to populate a log.

20. The apparatus of claim 18, wherein the system controller is connected to multiple different namespaces of the data storage device.

* * * * *